US012743200B1

(12) United States Patent
Jeganathan

(10) Patent No.: US 12,743,200 B1
(45) Date of Patent: Sep. 22, 2026

(54) SYSTEM AND METHOD FOR VISUALIZING DYNAMIC DIAGRAMS REPRESENTING DATA STREAMING SYSTEM CONFIGURATION

(71) Applicant: PALANTIR TECHNOLOGIES INC., Denver, CO (US)

(72) Inventor: Christopher Jeganathan, Islington (GB)

(73) Assignee: Palantir Technologies Inc., Aventura, FL (US)

( * ) Notice: Subject to any disclaimer, the term of this patent is extended or adjusted under 35 U.S.C. 154(b) by 263 days.

(21) Appl. No.: 18/772,924

(22) Filed: Jul. 15, 2024

Related U.S. Application Data

(60) Provisional application No. 63/659,218, filed on Jun. 12, 2024.

(51) Int. Cl.

| | |
|---|---|
| ***G06F 3/04847*** | (2022.01) |
| ***G06F 3/04817*** | (2022.01) |
| ***G06F 3/04845*** | (2022.01) |
| ***G06F 40/177*** | (2020.01) |

(52) U.S. Cl.
CPC ...... *G06F 3/04847* (2013.01); *G06F 3/04817* (2013.01); *G06F 3/04845* (2013.01); *G06F 40/177* (2020.01)

(58) Field of Classification Search
CPC .................................................. G06F 3/04847
USPC .......................................................... 715/771
See application file for complete search history.

(56) References Cited

U.S. PATENT DOCUMENTS

| | | | | |
|---|---|---|---|---|
| 6,857,104 | B1 * | 2/2005 | Cahn | G06F 3/0482 715/764 |
| 10,223,065 | B2 * | 3/2019 | Hoa | G06F 8/38 |
| 2004/0109031 | A1 * | 6/2004 | Deaton | G06T 19/00 715/848 |
| 2006/0095865 | A1 * | 5/2006 | Rostom | G06F 3/0482 715/779 |
| 2006/0270351 | A1 * | 11/2006 | Lastinger | H04W 72/542 455/63.1 |
| 2015/0100579 | A1 * | 4/2015 | Oba | H04L 41/0816 707/737 |
| 2015/0149962 | A1 * | 5/2015 | Jakobs | G06F 3/0482 715/825 |
| 2017/0205970 | A1 * | 7/2017 | Audet | G06F 3/0485 |

(Continued)

*Primary Examiner* — Reza Nabi
(74) *Attorney, Agent, or Firm* — Sheppard Mullin Richter & Hampton LLP

(57) ABSTRACT

This invention introduces a computer-implemented method that utilizes a graphical user interface (GUI) to manage a data streaming system comprising a data storage engine and a data processing engine. The GUI features at least two areas: the first displays channels corresponding to partitions in the storage engine, with dynamically moving objects representing streamed data. The second area is a user-configuration interface that allows adjustments to system settings like partition count and processing speed. Adjustments made via this interface trigger automatic updates to the storage and processing engines, reflecting in real-time through dynamic changes in the channels' display and the moving objects' speed. This system simplifies user interaction, providing a real-time, visual representation of data flow and system performance, enhancing the management and efficiency of data streaming operations.

18 Claims, 8 Drawing Sheets

(56) References Cited

U.S. PATENT DOCUMENTS

| | | | | |
|---|---|---|---|---|
| 2020/0073682 | A1* | 3/2020 | Strinden | G05B 19/0426 |
| 2020/0387417 | A1* | 12/2020 | Wang | G06F 16/2365 |
| 2021/0224178 | A1* | 7/2021 | Singh | G06F 9/44505 |
| 2022/0308912 | A1* | 9/2022 | Yamamoto | G06F 9/45558 |
| 2023/0315676 | A1* | 10/2023 | Huschle | G06F 9/45558<br>713/100 |
| 2023/0373648 | A1* | 11/2023 | Neis | B64D 45/00 |
| 2023/0377468 | A1* | 11/2023 | Sprengart | G01C 21/3697 |
| 2023/0396509 | A1* | 12/2023 | Woodworth | H04L 41/0813 |
| 2024/0004370 | A1* | 1/2024 | Schramm | G05B 19/418 |
| 2024/0056553 | A1* | 2/2024 | Brudy | G06F 3/1454 |
| 2024/0064395 | A1* | 2/2024 | O'Leary | H04N 23/635 |
| 2024/0195687 | A1* | 6/2024 | Shrestha | H04L 41/0816 |
| 2024/0338232 | A1* | 10/2024 | Copes | G06F 9/451 |
| 2024/0345798 | A1* | 10/2024 | Ramsperger | G05B 19/418 |
| 2024/0347048 | A1* | 10/2024 | Kagoshima | G06N 3/045 |
| 2024/0419658 | A1* | 12/2024 | Trache | H04L 67/306 |
| 2024/0430288 | A1* | 12/2024 | Parandehgheibi | H04L 63/1433 |
| 2025/0045060 | A1* | 2/2025 | Soal | G06F 8/71 |
| 2025/0115160 | A1* | 4/2025 | Yang, II | B60L 58/26 |
| 2025/0147832 | A1* | 5/2025 | Agrawal | G06F 11/0769 |
| 2025/0203412 | A1* | 6/2025 | Tofighbakhsh | H04W 24/08 |
| 2025/0203459 | A1* | 6/2025 | Tofighbakhsh | H04W 28/0958 |
| 2025/0240516 | A1* | 7/2025 | Zumbrunnen | G06F 1/1671 |
| 2025/0298632 | A1* | 9/2025 | Hein | G06F 9/44505 |
| 2026/0019699 | A1* | 1/2026 | Manzari | G06F 3/0482 |
| 2026/0019831 | A1* | 1/2026 | Tofighbakhsh | H04L 41/16 |
| 2026/0113358 | A1* | 4/2026 | Bompally | H04L 63/20 |

* cited by examiner

Input Streams into Partitions
Producer 1
Producer 2
Producer 3
Producer 4
Partition 0
Partition 1
Partition 2
0
1
2
3
4
5
6
7
8
9
10
11
12
Old
New

SYSTEM AND METHOD FOR VISUALIZING DYNAMIC DIAGRAMS REPRESENTING DATA STREAMING SYSTEM CONFIGURATION

CROSS-REFERENCE TO RELATED APPLICATIONS

This application claims priority to U.S. Provisional Patent Application No. 63/659,218, filed on Jun. 12, 2024 and entitled "SYSTEM AND METHOD FOR VISUALIZING DYNAMIC DIAGRAMS REPRESENTING STREAMING DATASET CONFIGURATION," which is incorporated herein by reference in its entirety.

FIELD OF THE INVENTION

This disclosure relates to using dynamic diagrams through a Graphic User Interface (GUI) to guide users through stream dataset configuration in a data streaming system.

BACKGROUND

Data streaming is an essential technology that enables real-time processing of continuous data flows within a data ecosystem. It involves the immediate ingestion, transformation, and consumption of data, allowing organizations to act swiftly on information as it becomes available. This rapid processing is critical in various scenarios, ranging from everyday activities like ordering food and transferring money to critical operations such as emergency response and system monitoring. The importance of data streaming stems from its ability to minimize the latency between data collection and decision-making, dramatically enhancing the responsiveness and effectiveness of business processes and services.

In practical terms, food and beverage manufacturers can now halt production of a given product minutes after identifying a defect. Airlines can swap aircraft and adjust crew schedules minutes after identifying an adverse weather pattern. Banks can suspend an account for review seconds after flagging a suspicious transaction. By reducing the gap between data collection and decision-making to close to zero, real-time data has brokered material improvements to countless business processes and in some cases enabled entirely new capabilities.

Despite the transformative potential of data streaming technologies such as Apache Kafka and Apache Flink, their deployment and management pose significant challenges. The complexity of configuring these systems can deter their adoption, especially among users who are not experts in the underlying technologies. Recognizing these challenges, this disclosure introduces a novel solution-a user-friendly interface for visualizing and managing data streaming platforms in real-time, which simplifies the user experience while maintaining robust processing capabilities.

SUMMARY

Various embodiments of the present disclosure can include computing systems, methods, and non-transitory computer-readable media configured to visualize dynamic diagrams representing streaming dataset configuration.

In one general aspect, a computer-implemented method may include displaying a graphic user interface (GUI) representing a data streaming system, where: the data streaming system may include a data storage engine and a data processing engine, the data storage engine may include a configurable number of partitions for ingesting a plurality of data streams in parallel, the data processing engine is configured to fetch data from the partitions for parallel processing, and the GUI may include a first displaying area and a second displaying area, where: the first displaying area displays (1) a plurality of channels respectively corresponding to the partitions, and (2) a plurality of dynamically moving objects moving through the plurality of channels representing data being streamed into the corresponding partitions, and the second displaying area displays a user-configuration interface allowing a user to adjust one or more configurations of the data streaming system.

The computer-implemented method may also include receiving an adjusted configuration from the user-configuration interface. Method may furthermore include automatically adjusting the data storage engine and/or the data processing engine based on the adjusted configuration. Method may in addition include dynamically scaling the plurality of channels displayed in the first displaying area to reflect a change of the number of partitions in response to the adjusted configuration. Method may moreover include dynamically increasing or decreasing a moving speed of the moving objects moving through the plurality of channels to reflect a change of processing speed in response to the adjusted configuration. Other embodiments of this aspect include corresponding computer systems, apparatus, and computer programs recorded on one or more computer storage devices, each configured to perform the actions of the methods.

Implementations may include one or more of the following features. The computer-implemented method where the GUI may include a third displaying area, where the third displaying area displays a dynamically changing table that may include a plurality of rows, each row representing a data set from one of the plurality of data streams.

The computer-implemented method where the rows representing data sets from a first data stream are colored using a first color, the rows representing data sets from a second data stream are colored using a second color.

The computer-implemented method where the moving objects representing the data sets from the first data stream are colored using the first color when traveling through the corresponding channel.

The computer-implemented method where the moving objects representing the data sets from the second data stream are colored using the second color when traveling through the corresponding channel.

The computer-implemented method may include configuring a moving speed of the moving objects traveling through a channel based on a processing speed of the data processing engine processing data sets from the data stream corresponding to the channel.

The computer-implemented method where the moving objects traveling through different channels are configured with different traveling speeds, representing that the data processing engine is handling overtaking among the data sets from different data streams.

The computer-implemented method where the handling overtaking among the data sets from different data streams may include reordering of the moving objects from different channels using timestamp-based reordering, key-based reordering, or event time-based reordering.

The computer-implemented method where: the user-configuration interface may include (1) a sliding bar representing a scale of throughput of the data streaming system and (2) an icon representing a current throughput of the data streaming system, and the adjusted configuration may include an adjusted throughput configuration when a user moves the icon along the sliding bar.

The computer-implemented method may include: in response to the adjusted throughput configuration having a throughput increase, dynamically instantiating one or more additional partitions to meet the throughput increase; displaying one or more additional channels in the first displaying area to represent the one or more additional partitions; and displaying moving objects traveling through the one or more additional channels when the plurality of data streams start to ingest into the one or more additional partitions.

The computer-implemented method where: the user-configuration interface is configured for a user to adjust the number of partitions in the data storage engine.

The computer-implemented method where the one or more configurations may include a throughput configuration, a key configuration, or a partition configuration. Implementations of the described techniques may include hardware, a method or process, or a computer tangible medium.

In one general aspect, system may include one or more processors. The system may also include memory storing instructions that, when executed by the one or more processors, cause the system to perform the above-described methods.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRA WINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

The technology described herein relates to systems and methods for visualizing dynamic diagrams representing a data streaming system configuration.

As briefly mentioned in the background section, in the realm of data streaming and processing, the advent of technologies such as Apache Kafka and Apache Flink has brought powerful capabilities to the forefront of enterprise software systems. However, the complexity inherent in configuring and managing these systems can often be a barrier to their effective use, particularly for users who may not be deeply versed in the underlying technologies.

One of the primary technical challenges addressed by this invention is the need for simplicity and usability in configuring data streaming processes. Users often desire to push data faster into systems and utilize it in transformations without getting entangled in the complexities of the infrastructure. The development of a "zero to value" interface that masks the intricate details of Kafka partitions and Flink processing behind a straightforward graphical user interface (GUI) significantly lowers the entry barrier. This interface enables users to interact with sophisticated streaming processes through visual elements like sliders, dropdowns, and straightforward graphical representations, which make configuring data streams accessible to non-specialists.

Another significant challenge is providing real-time feedback and effective visualization that accurately reflects changes in the backend configuration. As users adjust settings such as the number of partitions or throughput limits, it's crucial for the system to dynamically update to show how these changes impact the data flow and processing. This real-time visualization not only aids in better understanding and management of the data streams but also helps in troubleshooting and optimizing the data processing tasks. By integrating these visual feedback mechanisms, the system ensures that users can see the immediate effects of their configuration choices, fostering a more interactive and responsive user experience.

Furthermore, flexibility in stream configuration is essential for adapting to varied processing needs and data types. The solution described in disclosure addresses this by automatically generating configuration code snippets in response to user-made configurations, and allowing users to customize the code snippets to finetune key parameters such as schemas, throughput, and partition keys. In addition, the ability to dynamically generate code snippets based on user configurations further enables seamless integration with external applications and systems. For instance, dynamically generated code snippets can facilitate the integration of real-time data streams with Customer Relationship Management (CRM) systems, or create custom event handlers that respond to specific device telemetry signals in Internet of Things (IoT) Applications.

Figure 1:
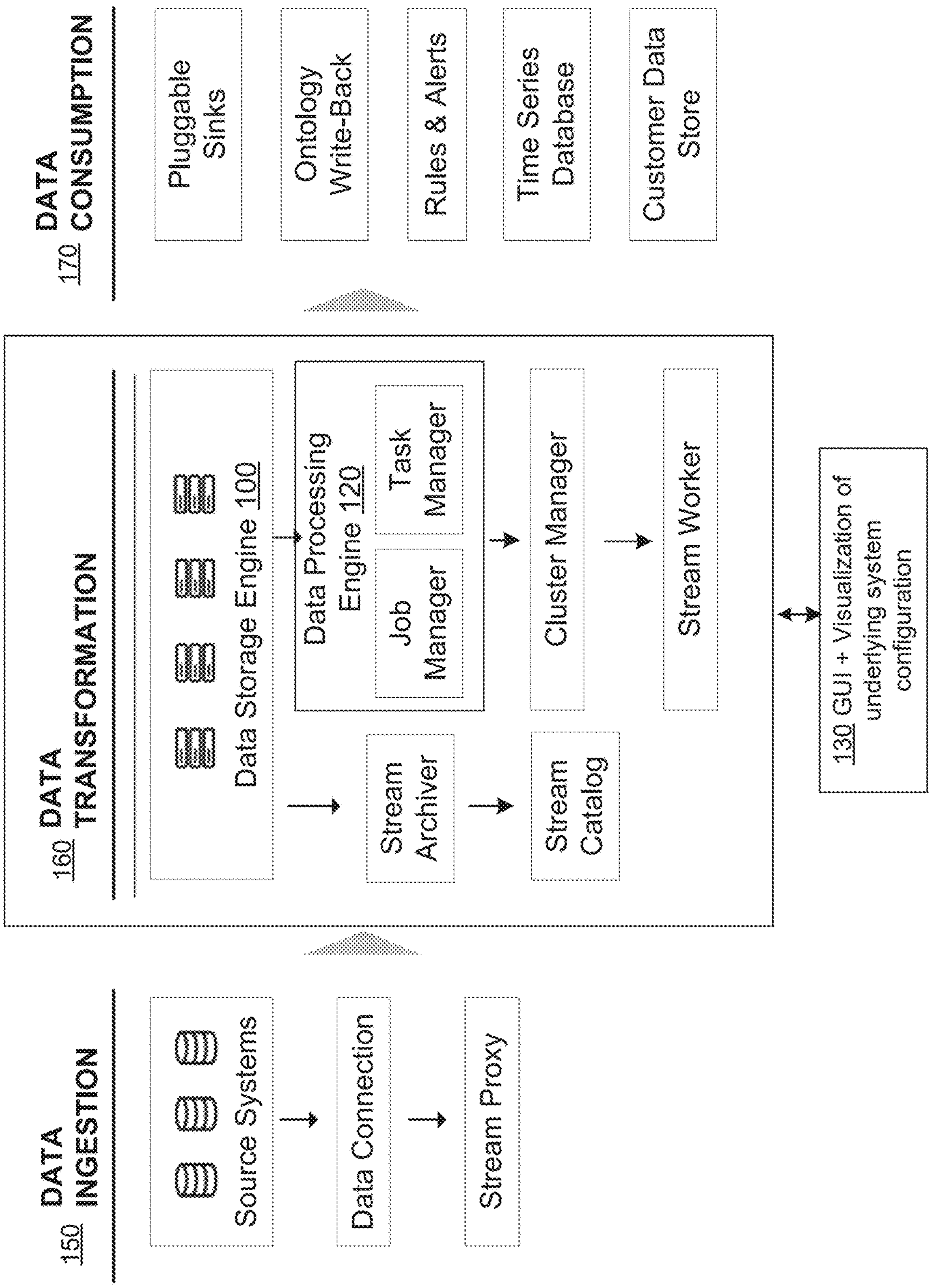
FIG. 1 illustrates an exemplary data streaming system in accordance with some embodiments.

FIG. 1 illustrates an exemplary data streaming system in accordance with some embodiments. The data streaming system in FIG. 1 is an example system designed to handle large volumes of data seamlessly from ingestion 150 to consumption 170, ensuring minimal latency and high efficiency.

As shown, the system acquires data from a variety of source systems in the data ingestion stage 150. This process is facilitated by a "Stream Proxy" that acts as the initial point of contact for incoming data streams. The data is validated and ingested through a "Data Connection," which ensures a seamless flow of data into the system.

For instance, in an e-commerce environment, real-time data processing is critical for managing transactions, inventory, and customer interactions efficiently. The data streaming system may be deployed to receive data from various source systems such as online shopping carts, payment gateways, and inventory management systems. In this case, the Stream Proxy acts as the gateway that receives transaction data, such as purchase orders and payment confirmations, from the e-commerce platform. It ensures that all incoming data is properly formatted and validated for consistency and completeness before passing it on. Post validation, the Data Connection component securely transmits this validated data into the data streaming system. It maintains a continuous and seamless flow of transaction data into the processing engine, where it can be analyzed for insights, such as buying trends, stock depletion rates, or potential fraudulent transactions.

As another example, in a smart home context, numerous Internet of Things (IoT) devices are connected and constantly generating data, such as smart thermostats, energy meters, and lighting systems. These devices monitor various aspects of home energy usage and environmental conditions, contributing to more efficient energy management. In this scenario, the Stream Proxy of the data streaming system acts as the gateway for data coming from all these IoT devices. Each device sends data, such as temperature readings, power consumption, and on/off status, to the Stream Proxy. The Stream Proxy performs initial checks to validate this data for correctness and completeness. For example, it ensures that the data formats are standardized and that timestamps are correct, which is crucial for synchronizing data streams from various devices. After the data is validated, the Data Connection component of the data streaming system securely and seamlessly transfers this data into the broader smart home system's data streaming architecture. This connection ensures that data from various sources is aggregated without interruption, maintaining a steady and reliable flow into the data processing system. The data collected and validated by the Stream Proxy and then streamed through the Data Connection is used by the home's energy management system to analyze and optimize energy usage. For instance, data from smart thermostats and energy meters can be processed in real-time to adjust heating or cooling systems dynamically based on current energy prices, weather forecasts, and the homeowners' preferences.

Referring back to FIG. 1, after ingestion 150, the data is channeled to the data transformation stage 160 where it is processed to derive actionable insights. This stage incorporates a data storage engine 100 and a data processing engine 120. The data storage engine 100 may be configured to manage a configurable number of partitions for ingesting the plurality of data streams from the data sources in parallel. For instance, the partitions may be dynamically adjusted to meet the user-desired data throughput. Additionally, and alternatively, users may control the number of partitions, which affects data processing and order guarantees. For instance, multiple partitions can cause data rows to overtake each other, while a single partition ensures ordered data processing. As another example, users may configure keys that determine into which partition specific data will go. This affects how data is ordered and processed within the system, allowing for fine-tuned control over data routing and prioritization.

The data processing engine 120 may be configured to fetch data from the partitions and perform computational tasks on the data in parallel using a plurality of compute clusters. It handles the heavy lifting of data processing tasks, applying complex algorithms and computations to the incoming data streams. This engine 120 may be designed to process large volumes of data efficiently and often supported by distributed computing resources to scale according to the data load and processing demands. In some embodiments, the data processing engine 120 may include essential management components such as a "Job Manager" and "Task Manager" that orchestrate and execute processing tasks, respectively. For instance, the Job Manager may be configured to oversee the distribution and management of processing tasks across the system, schedule jobs, manages their execution, and ensure that resources are allocated appropriately, optimizing the overall performance of the data transformation processes 160. The Job Manager may be responsible to maintain system efficiency and handle failures or bottlenecks by reallocating tasks as needed.

The Task Manager in the data processing engine 120 is responsible for executing the individual tasks that comprise a job. It manages the operational details of task execution, including initiating, pausing, and stopping tasks based on the Job Manager's directives and system status. This component may ensure that each task is processed correctly and efficiently, contributing to the robustness and reliability of the data transformation stage 160

Additionally, a "Cluster Manager" may be configured for lifecycle management tasks like maintaining software versions and managing computational resources, ensuring that the data processing is both efficient and scalable.

The "stream worker" may be responsible for processing data in real-time within compute clusters. A compute cluster may be made up of multiple nodes, where each node is typically an individual computer or server. These nodes share tasks and process data collaboratively. Each Stream Worker processes segments of data using predefined algorithms for tasks such as filtering and aggregation. These workers are designed to operate within a scalable framework, allowing them to handle large volumes of data through parallel processing.

In some embodiments, the components in the data transformation phase 160 are configurable, and the configuration of these components has direct impact on the performance of the system, including throughput, cost (e.g., instantiating more compute clusters and/or partitions would incur higher cost), power consumption, heat generation, etc. Users may configure these components to meet desired performance metrics.

However, traditional systems demand a high level of technical expertise, often necessitating familiarity with complex command line interfaces (CLIs) or proprietary tools. This creates a steep learning curve that can intimidate users who are not technically adept, significantly limiting system accessibility and usability. Moreover, manual configurations through command lines are prone to human error. Even minor mistakes in entering commands can lead to major issues like system downtime or degraded performance, posing substantial risks. Additionally, these manual processes are often time-consuming, requiring the execution of precise commands and following meticulous procedural steps, which can hinder operational efficiency. Another critical drawback of traditional systems is the lack of real-time feedback when making configuration changes. Without immediate insights into the effects of these adjustments, optimizing system performance becomes a trial-and-error process, often inefficient and risky.

To address these disadvantages, the GUI/Visualization component 130 for visualizing and configuring the underlying system provides an intuitive way for users to interact with the system through user-friendly graphical elements like menus, sliders, and checkboxes. This interface simplifies the entire process, reducing the likelihood of errors by automating configurations and offering built-in validations that guide users through the setup process more securely and effectively. Moreover, the GUI/Visualization component 130 enhances operational efficiency by allowing quicker changes with fewer steps and provide immediate, visual feedback on how configuration changes impact system performance. This feature is crucial for on-the-fly optimization, as it enables users to see real-time data on throughput, costs, and resource usage, facilitating informed decision-making, which is in consistent with the purpose of real-time data streaming systems. Finally, by democratizing access to complex data processing systems, the GUI/Visualization component 130 broadens the potential user base, fostering wider adoption and encouraging innovative applications of the technology. This shift not only enhances the system's accessibility but also its overall utility in diverse operational contexts. More details on the GUI/Visualization component 130 are described in FIG. 4A-4C.

Referring back to FIG. 1, in the final stage, transformed data is directed towards consumption 170. This stage includes transferring data to "Pluggable Sinks" which could be various end systems or applications that utilize the processed data. Features like "Ontology Write-Back" and "Rules & Alerts" play a role in integrating processed data back into business operations, enabling actions based on insights derived from the data. For example, the feature Ontology Write-Back organizes and stores processed data in accordance with the enterprise's predefined data governance frameworks and ontological structures. It ensures that the data remains consistent, reliable, and readily accessible across the enterprise, thereby supporting comprehensive data governance and streamlined access to critical information.

Figure 2:
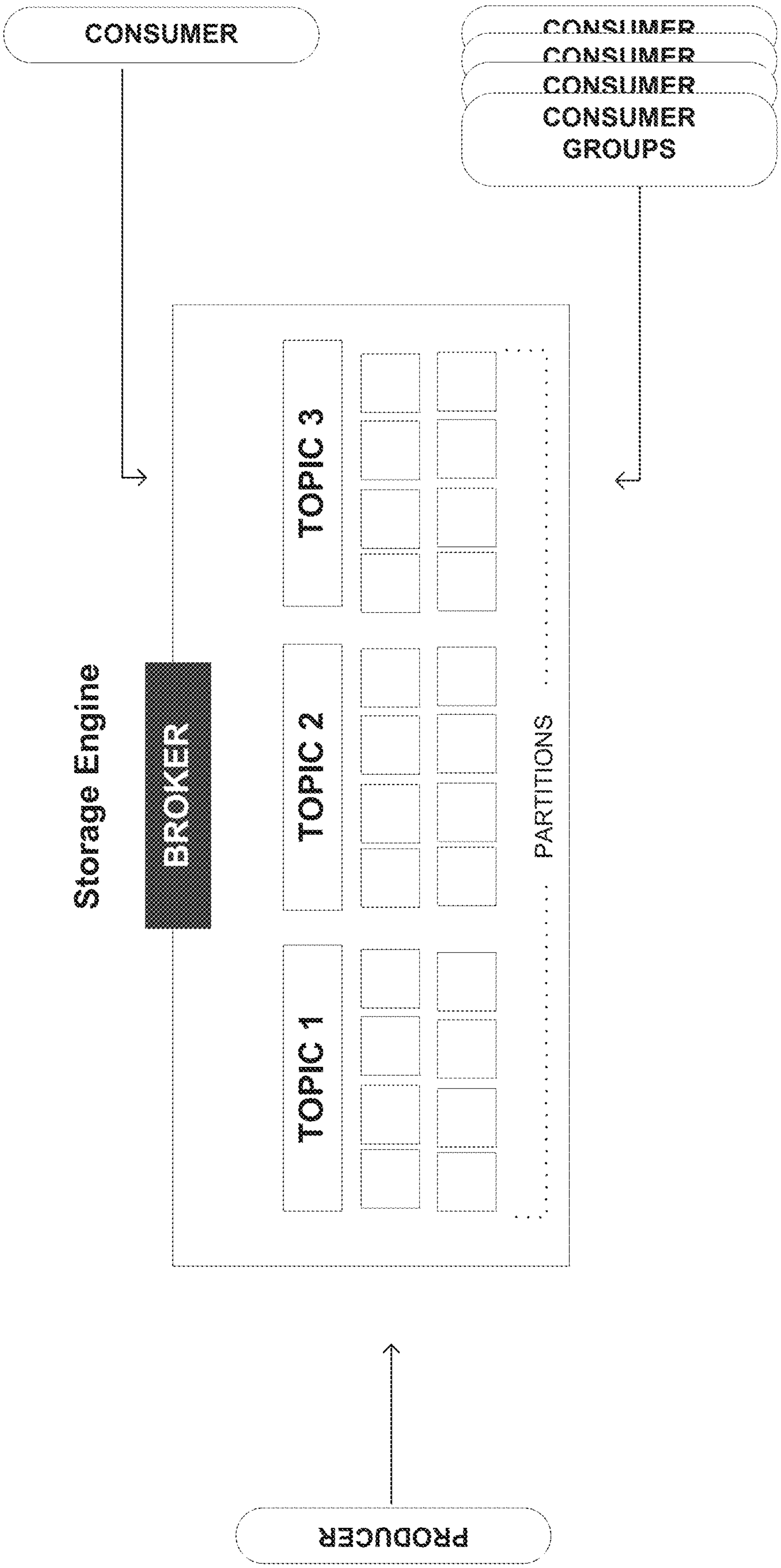
FIG. 2 illustrates an exemplary system diagram of data storage and consumption in a data streaming system, in accordance with some embodiments.

FIG. 2 illustrates an exemplary system diagram of data storage and consumption in a data streaming system, in accordance with some embodiments. The diagram in FIG. 2 uses a Kafka-based data streaming system as an example to illustrate the architecture for data storage and consumption. This diagram highlights several critical components such as brokers, topics, partitions, consumers, and consumer groups, each integral to the system's operation. A person skilled in the art would be able to map these components to other types of data streaming systems.

In some embodiments, the broker functions as the central server managing the storage and transmission of messages. The broker plays a pivotal role in both incoming and outgoing data flows, ensuring that messages are stored reliably and transmitted efficiently. Central to this architecture are multiple topics, such as Topic 1, Topic 2, and Topic 3, each representing different data streams or types. Topics serve as categories to which messages are published, organizing the data in a way that facilitates meaningful retrieval and processing. Importantly, topics, along with the number of partitions and the configuration of consumer groups, are configurable parameters that can be adjusted to optimize performance. These settings directly influence how data is managed and distributed across the system, affecting throughput and system responsiveness.

In some embodiments, each topic is further segmented into partitions, which enhance the system's scalability by distributing the data load across multiple nodes. Partitions allow the system to scale horizontally by distributing messages across multiple nodes. Each partition can exist on a different broker, enabling the system to handle more data by parallel processing across several servers. This setup enhances fault tolerance through data replication and improves performance by allowing consumer processes to read from multiple partitions concurrently. The number and configuration of these partitions are adjustable and can significantly affect the throughput and performance of the system.

Consumers, which are processes that subscribe to topics to read messages, are connected to these topics and retrieve data, processing or forwarding it as required. The Consumer forms the endpoint of the data streaming process, turning retrieved data into actionable insights. Additionally, FIG. 2 also illustrates consumer groups, which consist of multiple consumer instances that work collaboratively to consume data more efficiently from one or more topics. By allowing each consumer within a group to read from exclusive partitions, the system ensures efficient load balancing and enhances parallel processing capabilities. This setup prevents overlap in data processing among consumers within the same group, thereby optimizing throughput and overall system performance.

Moreover, the configuration of consumer groups, alongside key configurations such as partition settings and topic management, can be tailored to meet specific performance metrics. This flexibility in configuration enables administrators to adjust the system dynamically based on current data flow needs and performance objectives, further enhancing the system's effectiveness and responsiveness.

Overall, the data streaming system illustrated in FIG. 2 provides a flexible and configurable environment that maximizes efficiency, scalability, and reliability. By allowing key elements like topics, partitions, and consumer groups to be adjustable, the system can be finely tuned to deliver optimal performance tailored to specific operational demands.

Figure 3:
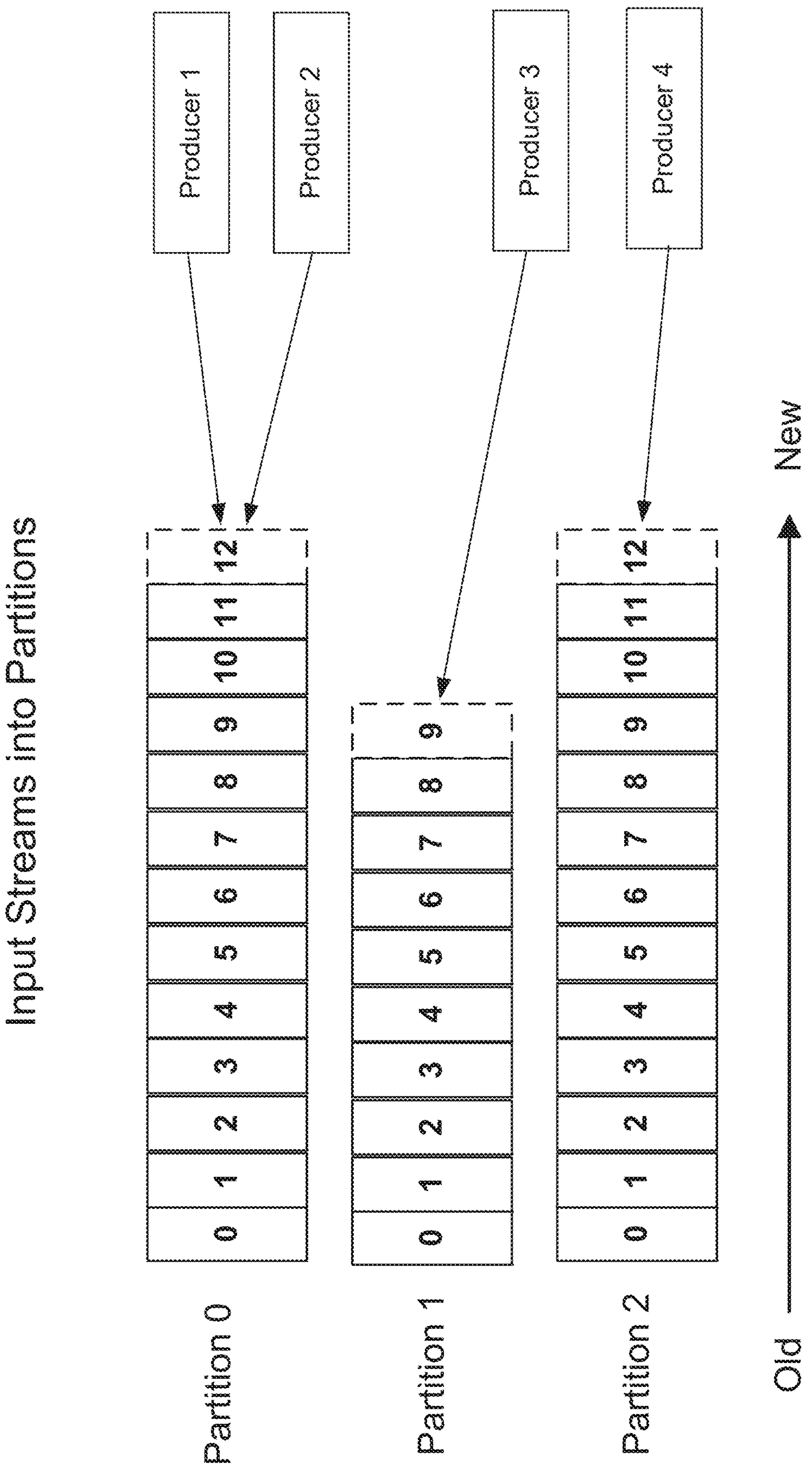
FIG. 3 illustrates exemplary data ingestion patterns, in accordance with some embodiments.

FIG. 3 shows exemplary data ingestion patterns, in accordance with some embodiments, illustrating how multiple producers can ingest data into different partitions within a Kafka-based data streaming system. The ingestion patterns illustrated in FIG. 3 showcase flexible ingestion mechanisms, such as many-to-one and one-to-one patterns, which are crucial for accommodating various operational needs.

In a many-to-one ingestion pattern, multiple producers—for instance, Producer 1 and Producer 2—send their data streams to a single partition, such as Partition 0. This approach is beneficial when data from diverse sources needs to be consolidated for sequential processing, which is essential for maintaining the order of operations where transactions or event sequences are interdependent. Conversely, the one-to-one pattern depicts scenarios (e.g., Producer 3 and 4 ingesting into partition 1 and 2 respectively) where each producer directs their data to an exclusive partition, enabling data to be processed concurrently across multiple partitions. This setup enhances system throughput and efficiency by leveraging parallel processing capabilities.

In some embodiments, data within any single partition is processed sequentially, ensuring that the items are handled in the exact order they are received. This sequential processing is vital for use cases where the order of data impacts the final outcomes, such as transactional systems where each step depends on the completion of the previous one, or a monitoring system that depicts the obtained signals is a strict chronological order. Meanwhile, data across different partitions can be processed in parallel, a key feature that allows the data streaming system to offer high scalability and performance by distributing the load.

The criticality of processing order within partitions is exemplified in scenarios like monitoring power consumption trajectories of IoT devices in a building. In this scenario, each device continuously monitors and sends power consumption data to a centralized monitoring system (i.e., the data streaming system) via a wireless network. This system is configured to display all power consumption readings in real-time on a graphical interface, making accurate sequential data processing essential for efficient energy management and operational planning.

To ensure the integrity and usefulness of the power consumption data, the system employs a key-based partitioning mechanism. Each IoT device's data is keyed by its unique identifiers, such as device ID or location within the building. This setup ensures that all power consumption readings for a specific device are kept in strict sequential order within a single partition. Maintaining this order is crucial because any misordering, such as displaying a sudden spike in power usage that did not occur, could lead to incorrect assessments of the building's energy consumption patterns and potentially misinform energy-saving strategies.

In this use case, each IoT device may transmit its data into separate partitions (e.g., one-to-one ingestion) to maximize parallelism. However, establishing a large number of partitions can lead to high costs due to the increased resources and management overhead required to effectively handle these partitions. For instance, each partition might require a portion of the system's resources, including CPU, memory, and storage. As the number of partitions increases, the cumulative resource demand also grows, potentially necessitating more powerful or additional servers. Additionally, each broker (node) can handle a certain number of partitions. As the number of partitions rises, the load on each broker can increase to a point where performance starts to degrade unless more brokers are added to the cluster.

Alternatively, multiple IoT devices may share the same partition (e.g., many-to-one ingestion) to minimize resource consumption at the cost of performance. In this setup, the power consumption readings from each device are tagged with timestamps to ensure that the order of the readings belonging to each individual device is still maintained within the partition. This approach optimizes resource usage while still providing a mechanism to ensure data integrity and order, essential for accurate real-time monitoring and analysis of energy usage within the building.

In summary, the configuration of data ingestion patterns, the number of partitions, the keys for data distribution, and the assignment of timestamps to input data offer multiple ways to tailor system performance. The method illustrated in FIGS. 4A-4C demonstrates an intuitive user interface that allows users to visualize, configure, and monitor the underlying system in real-time. This interface simplifies interaction with complex system settings, enabling users to effectively observe and optimize system performance while the intricate details of the system's operation remain abstracted, enhancing system manageability.

Figure 4A:
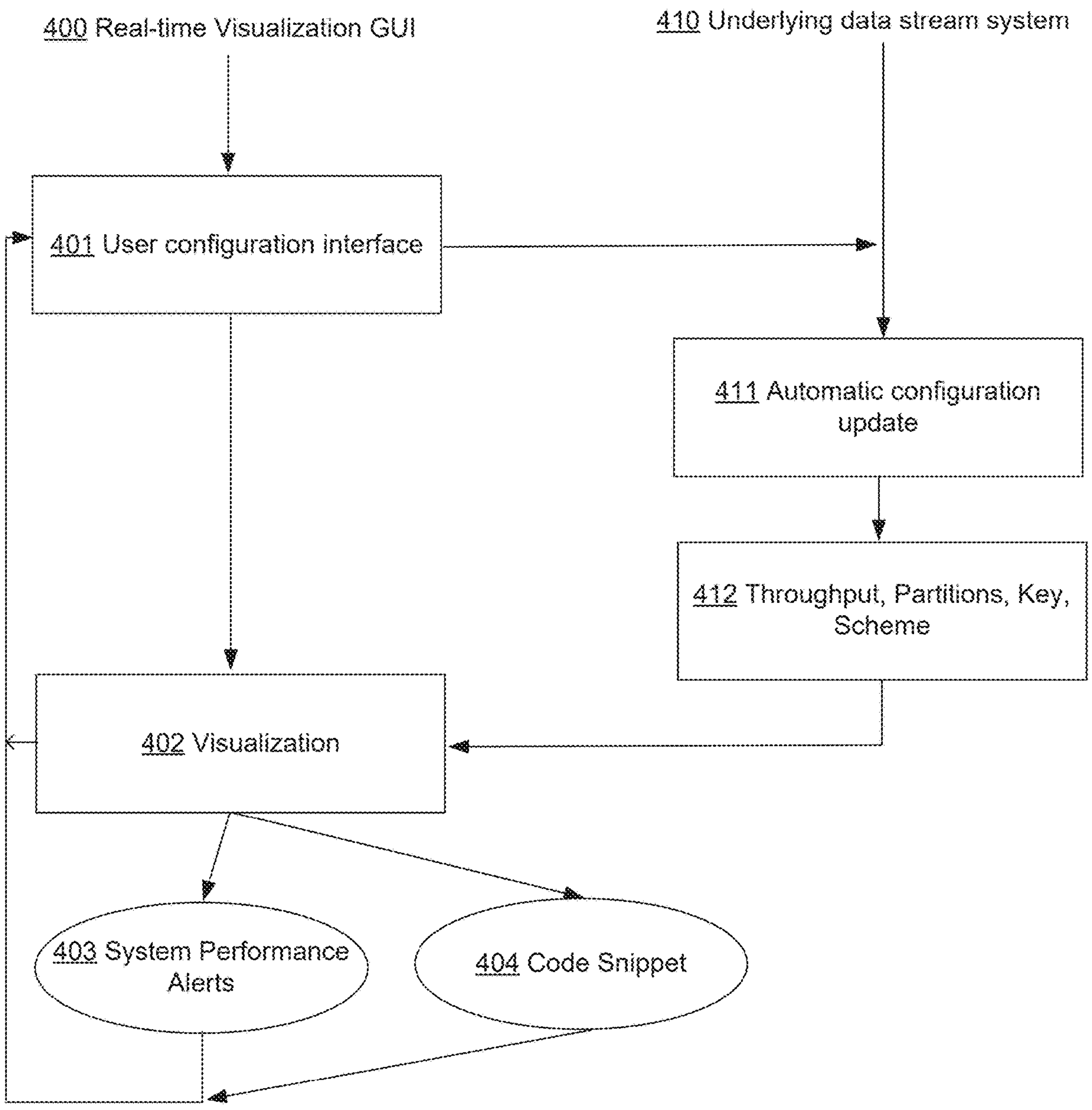
FIG. 4A illustrates an exemplary sequence diagram of visualizing dynamic diagrams representing the data streaming system configuration, in accordance with some embodiments.

FIG. 4A illustrates an exemplary sequence diagram of visualizing dynamic diagrams representing the data streaming system configuration, in accordance with some embodiments. The visualization not only shows the real-time reflection of th underlying system (e.g., performance/throughput, dynamically showing data being ingested into partitions and being fetched for processing, tracking the data from different sources being ingested into the partitions), but also allows a user to manage one or more configurations of the underlying system 410.

In some embodiments, the process begins with the display of a visualization on a Graphic User Interface (GUI) 400, which represents the underlying data streaming system 410 composed of a data storage engine and a data processing engine. The data storage engine is designed with a configurable number of partitions that are capable of ingesting multiple data streams in parallel. Concurrently, the data processing engine fetches data from these partitions to facilitate parallel processing, optimizing efficiency and throughput.

In some embodiments, the GUI may include two main displaying areas. The first area visually represents the data flow within the system through a plurality of channels, each corresponding to one of the partitions. Within these channels, dynamically moving objects illustrate the data as it streams into the respective partitions, providing a real-time, graphical depiction of data ingestion. This visualization aids users in understanding how data is distributed across the system and processed.

The second displaying area of the GUI may be dedicated to a user-configuration interface 401. This interface allows users to adjust configurations of the data streaming system, such as the number of partitions or the throughput settings. Adjustments made here directly influence the operational parameters of both the data storage and processing engines.

Upon receiving an adjusted configuration from the user-configuration interface 401, the system 410 automatically updates (411) both the data storage and processing engines as per the new settings. The updated configuration may include one or more of the throughput target, partition configuration, key configuration (for distributing data sources into the partitions), scheme configuration, etc. The scheme configuration specifies the fields present in the data, their data types (such as integers, strings, dates), and the relationships among different data fields. This schema is essential for ensuring that the data adheres to a specified format and structure, which facilitates effective processing and storage. This automated adjustment is a critical feature that ensures the system adapts seamlessly to the user's specifications without manual intervention.

For example, the underlying system 410 may the capability to automatically adjust its configuration to ensure optimized performance to meet the user-defined new requirements. The system may achieve this through a continuous cycle of monitoring performance metrics (like current throughput, partition load, and consumer lag), analyzing these metrics to determine if the existing configuration can support the new throughput, and making necessary adjustments based on this analysis. The technical mechanism underlying this feature involves sophisticated monitoring and analytics, combined with predefined rules or algorithms within the system's management layer. These components work together to predict outcomes based on historical data and real-time system status. If the analysis indicates that the current setup is insufficient, the system's configuration management tools are triggered to implement changes. These tools are designed to adjust settings dynamically, without necessitating system restarts or causing significant downtime, thus ensuring seamless operation.

Several examples of automatic adjustments can occur in response to an adjustment in target throughput.

For example, in response to a user-requested throughput increase, the system 410 may add more partitions to a topic. More partitions allow for better distribution of data, enabling greater parallel processing and increased throughput. When additional partitions are spun up, the GUI 400 may display additional channels corresponding to the additional partitions, and display moving objects traveling through the additional channels when input data streams start to ingest into the additional partitions.

As another example, the system 410 might adjust the mapping of input data sources to partitions (e.g., key-based, round-robin, random). This reallocation helps distribute the load evenly across all partitions, thus preventing any single partition from becoming overloaded and potentially turning into a performance bottleneck. In certain scenarios, particularly in response to a user's request to increase throughput, the system 410 may prefer to redistribute input data sources among existing partitions rather than increasing the number of partitions. This preference is driven by the goal to boost throughput while minimizing the costs associated with creating new partitions.

As yet another example, the system 410 may reassign consumers or consumer groups to different partitions in response to the user-requested configuration update. This ensures that data consumption is as efficient as possible and that consumer resources are optimally utilized.

As yet another example, the system 410 may also tweak the resources allocated to various nodes or processes, such as increasing memory or CPU priorities for critical tasks, to better support the required throughput. For instance, if the system 410 detects that one partition has a heavier load than other partitions (may happen when using a key-based data distribution scheme) and there is no practical way to redistribute the input data, it may increase the memory allocation and/or CPU priority to this particular partition.

In some embodiments, changes to the number of partitions necessitate adjustments in the replication factor, which is the number of copies of the data stored across different nodes. This helps balance data durability with performance needs.

While these adjustments being implemented by the underlying system 410, the GUI 400 continuously monitors the data processing patterns and dynamically scales the plurality of channels displayed in the first displaying area (by increasing or decreasing the number of channels in the visualization 402) to match the changed number of partitions, or adjusting the moving speed of the objects traveling through these channels to represent changes in the processing speed. Here, to effectively communicate changes in the processing speed within the system's visualization, the moving speed of the objects traveling through the display channels is proportionally adjusted. These objects represent the actual speed at which consumers are processing data from each partition. Since the true processing speeds are measured in milliseconds—a rate that is too swift for practical observation—the displayed moving speed of these objects is proportionally moderated to ensure it is perceptible to human viewers. This proportional representation allows the visualization to meaningfully reflect variations in data consumption rates across different partitions, making it possible for users to visually comprehend and compare the processing speeds, while maintaining readability and utility of the display.

In some embodiments, in addition to the channels and moving objects, the visualization 402 may also include system performance alerts 403 and/or code snippets 404. The system performance alerts 403 may be displayed when the underlying system 410 detects unbalanced workload distributions among the partitions, and the degree of unbalance is beyond a threshold. The performance alerts 403 may indicate the heavy-loaded partition may become a performance bottleneck while the light-loaded partition may be underutilized.

The code snippet 404 may be dynamically generated when a user makes adjustment to the underlying system 410. While the user-requested adjustment may be at the user-level, e.g., by using a slide bar to increase or decrease throughput or by requesting a key change, the code snippet 404 may be generated at a programming language-based level to reflect the actual configuration change under the hood to achieve the user-requested adjustment. The code snippet 404 provides an option for the user to understand the actual configuration change and/or to fine-tune the underlying configuration.

These code snippets 404 significantly ease the integration of the streaming system into user applications by providing ready-to-use code that can be directly incorporated and implemented, eliminating the need for users to write extensive boilerplate code. This not only speeds up the development process but also helps in reducing the learning curve for those who may not be deeply familiar with the system's syntax or APIs.

Furthermore, the use of code snippets 404 helps in minimizing coding errors. Since they are usually based on proven templates and customized according to precise system configuration parameters, they adhere to best practices and enhance the reliability of the applications being developed. They also serve as a form of documentation or system log, providing clear examples of how specific configurations or functionalities can be implemented, which is useful for training purposes or as a reference during system maintenance.

Figure 4B:
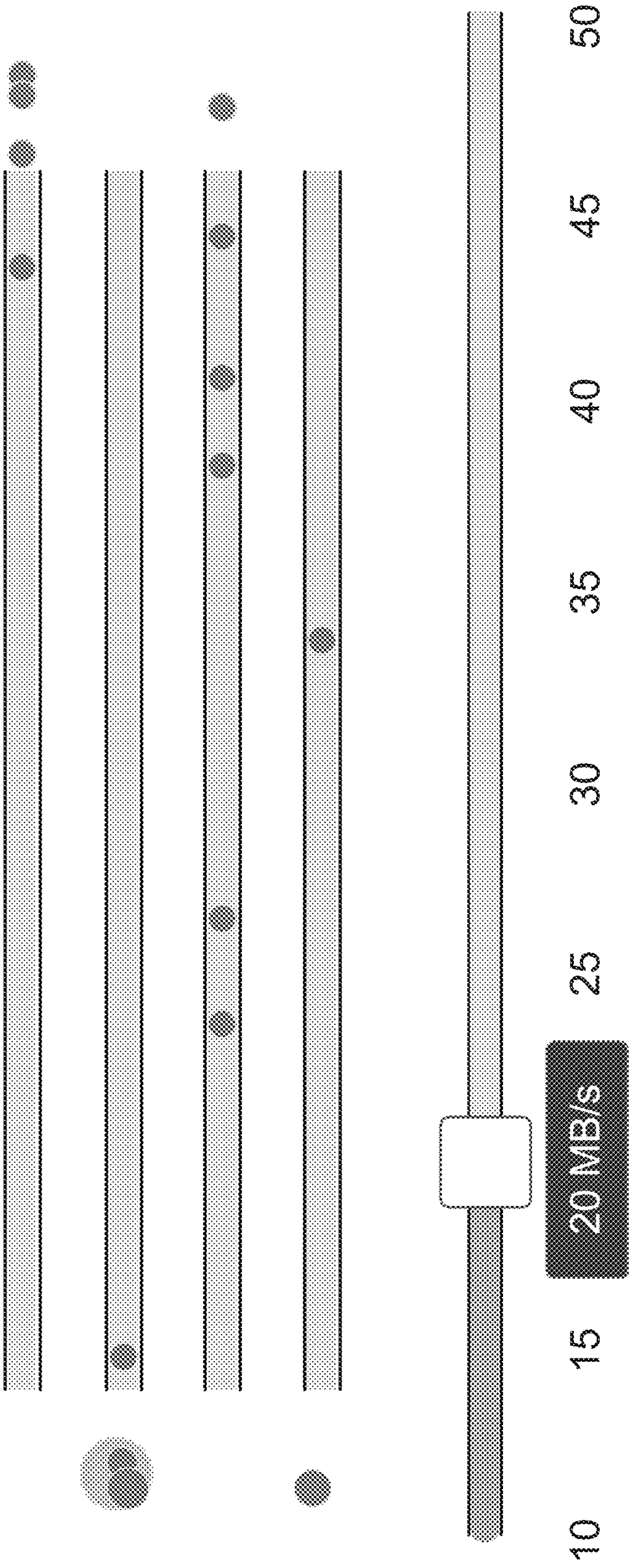
FIG. 4B illustrates an exemplary Graphic User Interface (GUI) for visualizing dynamic diagrams representing the data streaming system configuration, in accordance with some embodiments.

FIG. 4B illustrates an exemplary Graphic User Interface (GUI) for visualizing dynamic diagrams representing the data streaming system configuration, in accordance with some embodiments. As shown, the GUI in FIG. 4B includes a sliding bar labeled with target throughput values. The current throughput setting (indicated by the icon) in the example of FIG. 4B is 20 MB/s. Additionally, the GUI features several channels through which moving objects travel, representing the data pieces being input and the channels themselves signifying partitions within the storage engine of the system.

As a moving object enters a channel, it indicates that a data piece has been stored in the corresponding partition. Conversely, when a moving object exits a channel, it signifies that the data piece is fetched for consumption. The speed at which these objects move through the channels reflects the processing speed of data within that partition. Given that data within each partition is processed sequentially based on their order of arrival, using a single-lane channel to represent each partition accurately visualizes the processing speed.

In response to user adjustments to the system configuration, such as changes in the throughput target or partition structure, the GUI dynamically adapts in two ways: First, it scales the number of channels displayed in the first displaying area to align with the modified number of partitions. This visual adjustment helps users instantly recognize changes in the partition configuration and understand their impact on data flow. Secondly, the GUI dynamically alters the moving speed of the objects traveling through the channels to mirror any changes in the processing speed dictated by the new configuration. This feature provides real-time feedback on how the adjustments affect system performance, offering a direct visual correlation between configuration changes and operational impacts.

Figure 4C:
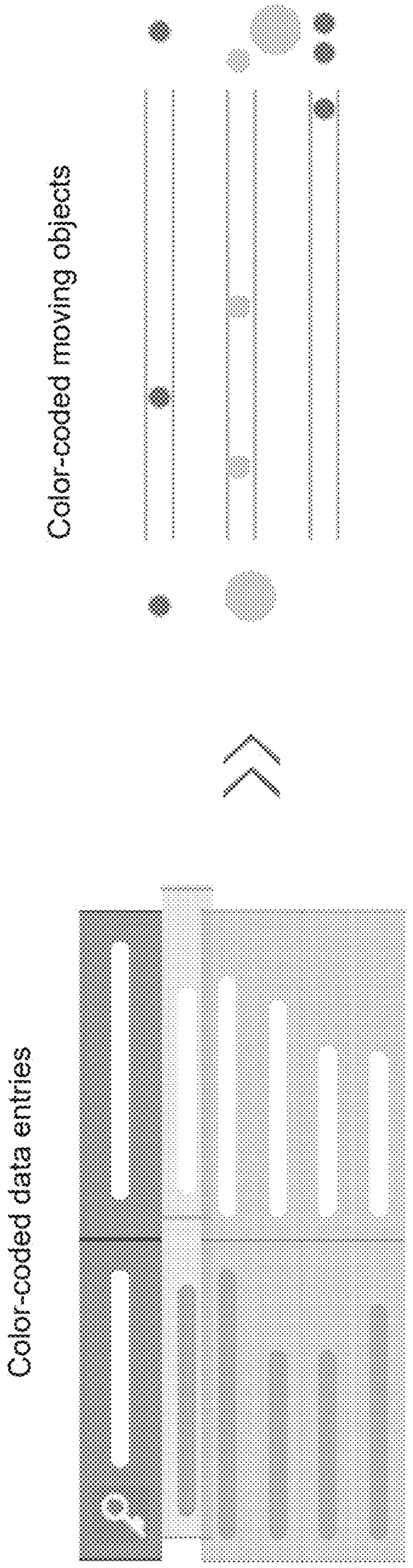
FIG. 4C illustrates another exemplary Graphic User Interface (GUI) for visualizing dynamic diagrams representing the data streaming system configuration, in accordance with some embodiments.

FIG. 4C illustrates another exemplary Graphic User Interface (GUI) for visualizing dynamic diagrams representing the data streaming system configuration, in accordance with some embodiments. The GUI of FIG. 4C may be implemented as an enhanced version of the GUI of FIG. 4B, or a complimentary component displayed along with the GUI of FIG. 4B.

In particular, the GUI in FIG. 4C includes a data entry table with color coding. Each data stream is assigned a unique color, which helps in distinguishing data sets originating from different sources as they are processed through the system. For instance, data rows from a first data stream are consistently colored using a first color, while those from a second data stream are depicted using a second color. This color-coding aids in visual segmentation and enhances the clarity of data flow across the system.

As data is distributed into multiple partitions and potentially overtakes due to parallel processing, the GUI dynamically displays moving objects that represent these data sets as they travel through various channels in the visualization. These moving objects adopt the color coding of their respective data streams. For example, moving objects representing data sets from the second data stream are colored using the second color when they navigate through their corresponding channel, and similarly, those from the first data stream are shown in the first color. Here, the "overtaking" refers to a situation where the order in which data records are processed does not match the order in which they were originally sent or produced. This typically occurs when data from the same stream is split across multiple partitions, which are processed in parallel. As a result, data from one partition may be processed faster than data from another, leading to scenarios where later records are processed before earlier ones.

This method of visual differentiation is particularly effective in real-time scenarios where reordering of data is necessary due to overtaking. As the system performs timestamp-based, key-based, or event time-based reordering to correct sequence discrepancies, the differently colored moving objects adjust their speeds and positions within the channels. This not only reflects changes in processing speed due to the reordering operation but also visually communicates the ongoing adjustments in data handling, providing a clear and immediate depiction of how data integrity is maintained across streams.

Figure 5:
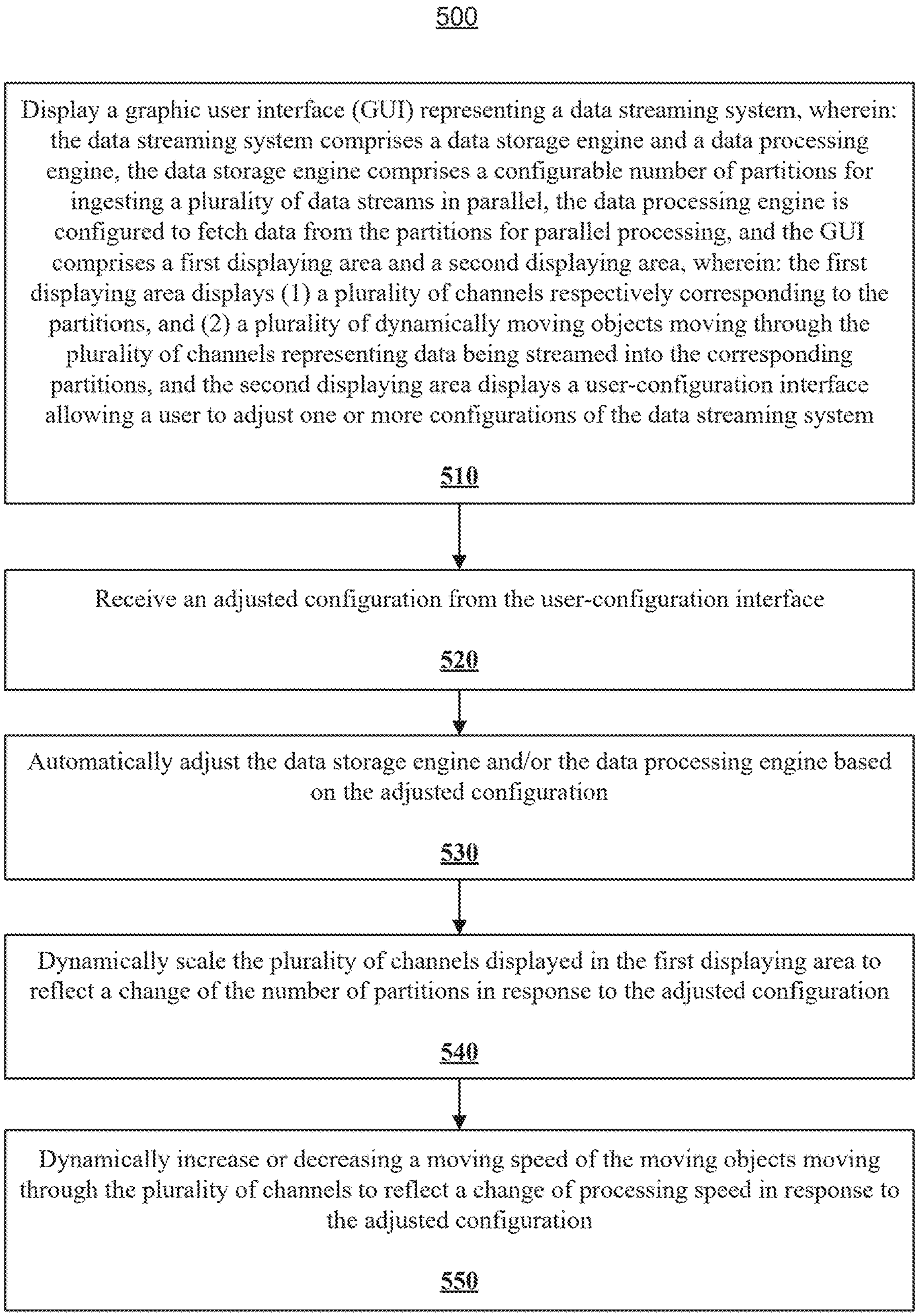
FIG. 5 illustrates an exemplary method for visualizing dynamic diagrams representing the data streaming system configuration, in accordance with some embodiments.

FIG. 5 illustrates an exemplary method 500 for visualizing dynamic diagrams representing the data streaming system configuration, in accordance with some embodiments. In some implementations, one or more process blocks of FIG. 5 may be performed by a computing device.

As shown in FIG. 5, process 500 may include displaying a graphic user interface (GUI) representing a data streaming system, where: the data streaming system may include a data storage engine and a data processing engine, the data storage engine may include a configurable number of partitions for ingesting a plurality of data streams in parallel, the data processing engine is configured to fetch data from the partitions for parallel processing, and the GUI may include a first displaying area and a second displaying area, where: the first displaying area displays (1) a plurality of channels respectively corresponding to the partitions, and (2) a plurality of dynamically moving objects moving through the plurality of channels representing data being streamed into the corresponding partitions, and the second displaying area displays a user-configuration interface allowing a user to adjust one or more configurations of the data streaming system (block 510). For example, the computing device may display a graphic user interface (GUI) representing a data streaming system, where: the data streaming system may include a data storage engine and a data processing engine, the data storage engine may include a configurable number of partitions for ingesting a plurality of data streams in parallel, the data processing engine is configured to fetch data from the partitions for parallel processing, and the GUI may include a first displaying area and a second displaying area, where: the first displaying area displays (1) a plurality of channels respectively corresponding to the partitions, and (2) a plurality of dynamically moving objects moving through the plurality of channels representing data being streamed into the corresponding partitions, and the second displaying area displays a user-configuration interface allowing a user to adjust one or more configurations of the data streaming system, as described above.

As also shown in FIG. 5, process 500 may include receiving an adjusted configuration from the user-configuration interface (block 520). For example, computing device may receive an adjusted configuration from the user-configuration interface, as described above.

As further shown in FIG. 5, process 500 may include automatically adjusting the data storage engine and/or the data processing engine based on the adjusted configuration (block 530). For example, the computing device may automatically adjust the data storage engine and/or the data processing engine based on the adjusted configuration, as described above.

As also shown in FIG. 5, process 500 may include dynamically scaling the plurality of channels displayed in the first displaying area to reflect a change of the number of partitions in response to the adjusted configuration (block 540). For example, computing device may dynamically scale the plurality of channels displayed in the first displaying area to reflect a change of the number of partitions in response to the adjusted configuration, as described above.

As further shown in FIG. 5, process 500 may include dynamically increasing or decreasing a moving speed of the moving objects moving through the plurality of channels to reflect a change of processing speed in response to the adjusted configuration (block 550). For example, computing device may dynamically increase or decreasing a moving speed of the moving objects moving through the plurality of channels to reflect a change of processing speed in response to the adjusted configuration, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
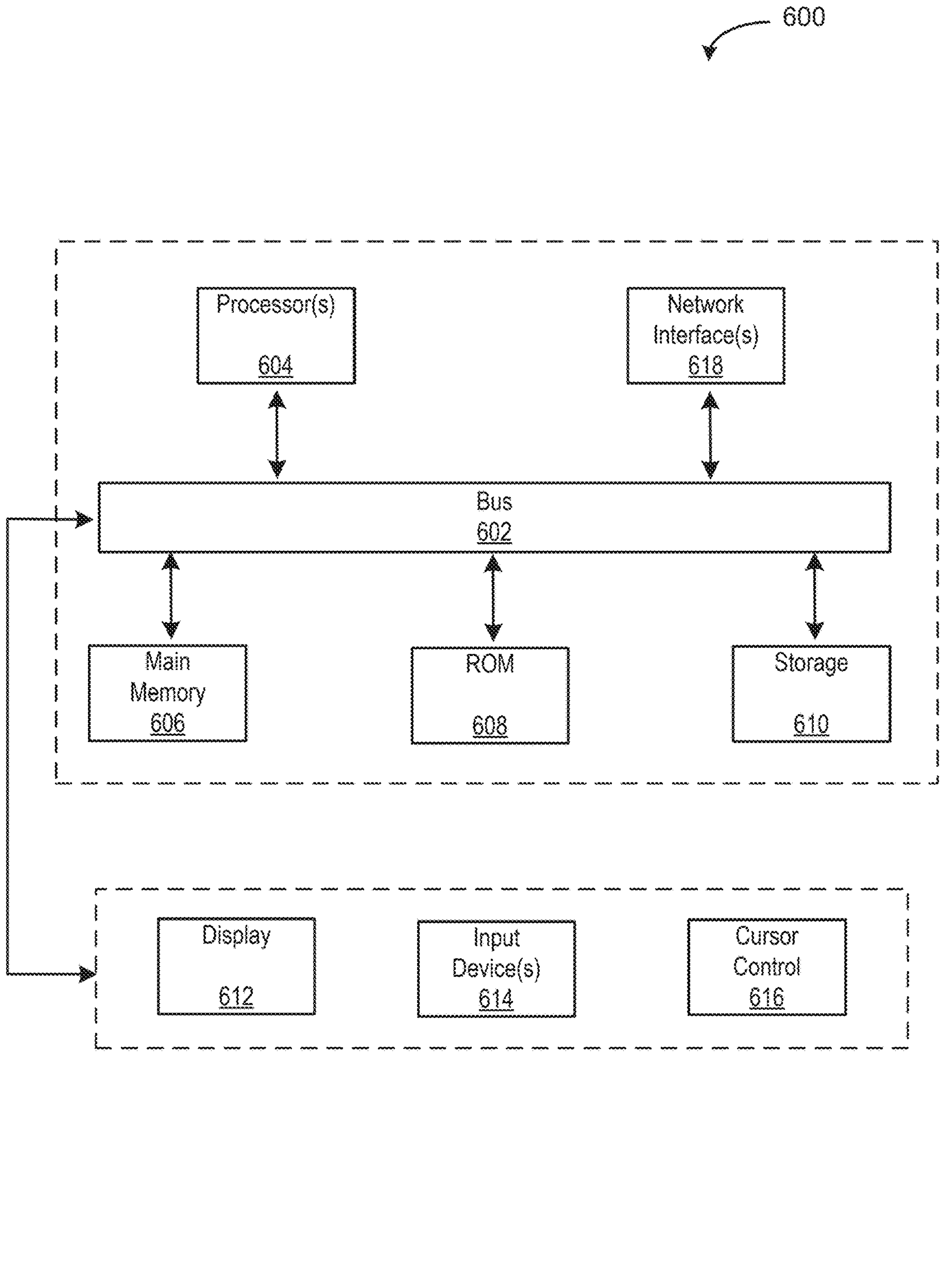
FIG. 6 illustrates a block diagram of an example computer system in which any of the embodiments described herein may be implemented.

FIG. 6 illustrates a block diagram of an example computer system 500 in which any of the embodiments described herein may be implemented.

The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random-access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 616, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 606 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 606 retrieves and executes the instructions. The instructions received by main memory 606 may retrieves and executes the instructions. The instructions received by main memory 606 may optionally be stored on storage device 610 either before or after execution by processor 606.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 606 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises, a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term “or” may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, “can,” “could,” “might,” or “may,” unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method, comprising: displaying a graphic user interface (GUI) representing a data streaming system, wherein: the data streaming system comprises a data storage engine and a data processing engine, the data storage engine comprises a configurable number of partitions for ingesting a plurality of data streams in parallel, the data processing engine is configured to fetch data from the partitions for parallel processing, and the GUI comprises a first displaying area and a second displaying area, wherein: the first displaying area displays (1) a plurality of channels respectively corresponding to the partitions, and (2) a plurality of dynamically moving objects moving through the plurality of channels representing data being streamed into the corresponding partitions, and the second displaying area displays a user-configuration interface allowing a user to adjust one or more configurations of the data streaming system; receiving an adjusted configuration from the user-configuration interface; automatically adjusting the data storage engine and/or the data processing engine based on the adjusted configuration; dynamically scaling the plurality of channels displayed in the first displaying area to reflect a change of the number of partitions in response to the adjusted configuration; and dynamically increasing or decreasing a moving speed of the moving objects moving through the plurality of channels to reflect a change of processing speed in response to the adjusted configuration, wherein: the user-configuration interface is configured for a user to adjust the number of partitions in the data storage engine.

2. The computer-implemented method of claim 1, wherein the GUI further comprising a third displaying area, wherein the third displaying area displays a dynamically changing table that comprises a plurality of rows, each row representing a data set from one of the plurality of data streams.

3. The computer-implemented method of claim 2, wherein the rows representing data sets from a first data stream are colored using a first color, the rows representing data sets from a second data stream are colored using a second color.

4. The computer-implemented method of claim 3, wherein the moving objects representing the data sets from the first data stream are colored using the first color when traveling through the corresponding channel.

5. The computer-implemented method of claim 3, wherein the moving objects representing the data sets from the second data stream are colored using the second color when traveling through the corresponding channel.

6. The computer-implemented method of claim 1, further comprising: configuring a moving speed of the moving objects traveling through a channel based on a processing speed of the data processing engine processing data sets from the data stream corresponding to the channel.

7. The computer-implemented method of claim 6, wherein the moving objects traveling through different channels are configured with different traveling speeds, representing that the data processing engine is handling overtaking among the data sets from different data streams.

8. The computer-implemented method of claim 7, wherein the handling overtaking among the data sets from different data streams comprises reordering of the moving objects from different channels using timestamp-based reordering, key-based reordering, or event time-based reordering.

9. The computer-implemented method of claim 1, wherein: the user-configuration interface comprises (1) a sliding bar representing a scale of throughput of the data streaming system and (2) an icon representing a current throughput of the data streaming system, and the adjusted configuration comprises an adjusted throughput configuration when a user moves the icon along the sliding bar.

10. The computer-implemented method of claim 9, further comprising: in response to the adjusted throughput configuration comprising a throughput increase, dynamically instantiating one or more additional partitions to meet the throughput increase; displaying one or more additional channels in the first displaying area to represent the one or more additional partitions; and displaying moving objects traveling through the one or more additional channels when the plurality of data streams start to ingest into the one or more additional partitions.

11. A system for visualizing a real-time configuration change of a data streaming system, comprising: one or more processors; and memory storing instructions that, when executed by the one or more processors, cause the system to perform operations comprising: displaying a graphic user interface (GUI) representing a data streaming system, wherein: the data streaming system comprises a data storage engine and a data processing engine, the data storage engine comprises a configurable number of partitions for ingesting a plurality of data streams in parallel, the data processing engine is configured to fetch data from the partitions for parallel processing, and the GUI comprises a first displaying area and a second displaying area, wherein: the first displaying area displays (1) a plurality of channels respectively corresponding to the partitions, and (2) a plurality of dynamically moving objects moving through the plurality of channels representing data being streamed into the corresponding partitions, and the second displaying area displays a user-configuration interface allowing a user to adjust one or more configurations of the data streaming system; receiving an adjusted configuration from the user-configuration interface; automatically adjusting the data storage engine and/or the data processing engine based on the adjusted configuration; dynamically scaling the plurality of channels displayed in the first displaying area to reflect a change of the number of partitions in response to the adjusted configuration; and dynamically increasing or decreasing a moving speed of the moving objects moving through the plurality of channels to reflect a change of processing speed in response to the adjusted configuration, wherein: the user-configuration interface is configured for a user to adjust the number of partitions in the data storage engine.

12. The system of claim 11, wherein the GUI further comprising a third displaying area, wherein the third displaying area displays a dynamically changing table that comprises a plurality of rows, each row representing a data set from one of the plurality of data streams.

13. The system of claim 11, wherein the operations further comprise: configuring a moving speed of the moving objects traveling through a channel based on a processing speed of the data processing engine processing data sets from the data stream corresponding to the channel.

14. The system of claim 13, wherein the moving objects traveling through different channels are configured with different traveling speeds, representing that the data processing engine is handling overtaking among the data sets from different data streams.

15. The system of claim 14, wherein the handling overtaking among the data sets from different data streams comprises reordering of the moving objects from different channels using timestamp-based reordering, key-based reordering, or event time-based reordering.

16. A non-transitory computer readable media comprising instructions that, when executed, cause one or more processors to perform operations comprising: displaying a graphic user interface (GUI) representing a data streaming system, wherein: the data streaming system comprises a data storage engine and a data processing engine, the data storage engine comprises a configurable number of partitions for ingesting a plurality of data streams in parallel, the data processing engine is configured to fetch data from the partitions for parallel processing, and the GUI comprises a first displaying area and a second displaying area, wherein: the first displaying area displays (1) a plurality of channels respectively corresponding to the partitions, and (2) a plurality of dynamically moving objects moving through the plurality of channels representing data being streamed into the corresponding partitions, and the second displaying area displays a user-configuration interface allowing a user to adjust one or more configurations of the data streaming system; receiving an adjusted configuration from the user-configuration interface; automatically adjusting the data storage engine and/or the data processing engine based on the adjusted configuration; dynamically scaling the plurality of channels displayed in the first displaying area to reflect a change of the number of partitions in response to the adjusted configuration; and dynamically increasing or decreasing a moving speed of the moving objects moving through the plurality of channels to reflect a change of processing speed in response to the adjusted configuration, wherein the one or more configurations comprise a throughput configuration, a key configuration, or a partition configuration.

17. The non-transitory computer readable media of claim 16, wherein the GUI further comprising a third displaying area, wherein the third displaying area displays a dynamically changing table that comprises a plurality of rows, each row representing a data set from one of the plurality of data streams.

18. The non-transitory computer readable media of claim 16, wherein the operations further comprise: configuring a moving speed of the moving objects traveling through a channel based on a processing speed of the data processing engine processing data sets from the data stream corresponding to the channel.

* * * * *